Nov. 28, 1933.  C. A. SCHACHT  1,937,438
CASTER
Filed July 29, 1931
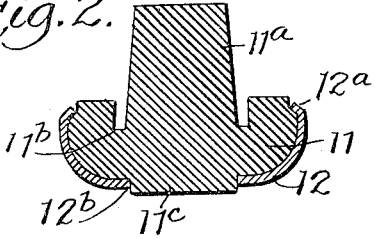
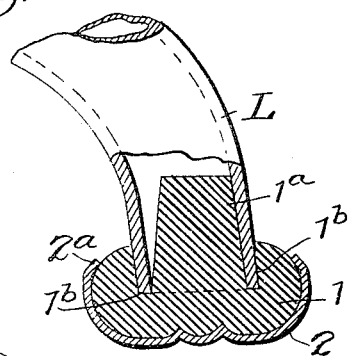
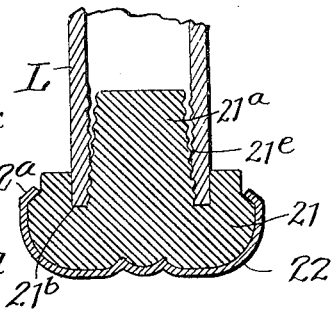
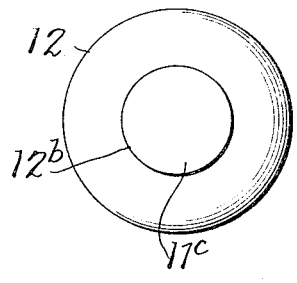
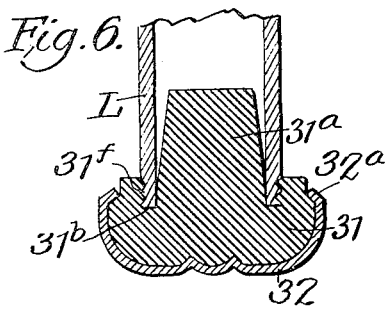
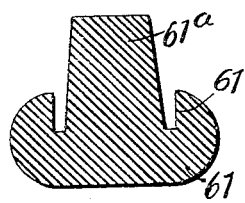
Inventor
Clifford A. Schacht Patented Nov. 28, 1933

1,937,438

UNITED STATES PATENT OFFICE 1,937,438

CASTER

Clifford A. Schacht, Huntington, Ind.

Application July 29, 1931. Serial No. 553,830

3 Claims. (Cl. 16—42)

This invention is a novel resilient caster particularly adapted to be inserted in the hollow legs of metallic furniture which legs are usually formed of tubular steel or thin sheet metal, and one object of the invention is to provide a caster, either slidable or non-slidable, which will frictionally grip either the inner, or outer, or both faces of the legs at the lower edges thereof to hold the caster in position thereon.

Heretofore much trouble has been experienced in obtaining casters which would fit openings of different sizes in such legs, and another object of the invention is to provide a novel caster of the above type having a resilient retaining shank which will snugly fit various sizes of metal furniture legs and be frictionally held therein without using retaining screws, bolts, or the like.

My novel resilient caster is therefore provided with an integral conical shank adapted to fit various sizes of openings in the legs, and is provided with a relatively deep and narrow annular recess around the base of the shank to receive the lower end of the leg so that the caster will frictionally grip the leg both on its inside and on its outside surfaces.

Other objects are to provide a caster of the above type having a hard shell around the base of the rubber or resilient body to render the caster slidable, and also to keep the rubber from spreading; also to provide a caster in which the bottom of the shell is perforated to permit lugs on the body to project therethrough, and render the caster relatively non-slidable; also to provide a caster in which the rubber shank is threaded or corrugated, and the inner walls of the recess around the shank are also threaded or corrugated to more securely grip the inner or outer faces of the lower end of the leg.

Other minor objects of the invention will be hereinafter set forth.

I will explain the invention with reference to the accompanying drawing which illustrates several practical embodiments thereof to enable others to adopt and use the same; and will summarize in the claims the novel features of construction, and novel combinations of parts, for which protection is desired.

In said drawing:

Fig. 1 is a vertical section through a hollow leg showing one form of my novel caster secured therein.

Fig. 2 is a vertical section through a modified form of caster.

Fig. 3 is a bottom plan view of the caster shown in Fig. 2.

Fig. 4 is a bottom plan view of a further modified caster.

Figs. 5, 6, 7, 8 and 9 are vertical sections through still further modified forms of the caster.

Figs. 10 and 11 show modified means of locking the caster to the leg.

As shown in Fig. 1 my novel caster preferably comprises a molded soft rubber or other resilient body 1 of greater diameter or width than that of the hollow leg L, the body 1 having an integral shank 1a of relatively large diameter adapted to extend upwardly into the lower end of the hollow leg L, the shank 1 being preferably slightly tapered as shown whereby the same may yieldably fit various other sizes of legs.

At the base of the shank 1a is a relatively deep and narrow annular recess 1b adapted to snugly receive the lower end of the hollow leg L as shown in Fig. 1 whereby the rubber of the body will grip both the inside and outside faces of the leg at its lower end, and frictionally hold the caster in position on the leg. Also as the legs L each seat in a resilient body 1, the several casters supporting the furniture will cushion the latter, compensating for slight differences in the lengths of the several legs of the furniture, causing the same to seat squarely on the floor surface.

Around the sides and bottom of the rubber body 1 is a cup-shaped shell 2 preferably made of metal, but same may be made of wood, bakelite, glass or other hard slidable material. The shell 2 is similar to those shown in my companion applications, Serial No. 536,026 filed May 8, 1931, matured into Patent No. 1,855,844, April 26, 1932; Serial No. 539,936 filed May 25, 1931, matured into Patent No. 1,861,094, May 31, 1932; and Serial No. 543,191 filed June 9, 1931, matured into Patent No. 1,861,191, May 31, 1932; and preferably conforms with the contour of the base and sides of the rubber body 1 and has its upper end flanged, rolled or bent slightly inwardly as at 2a to securely lock the rubber body 1 within the shell, and to prevent the rubber body from spreading and to permit the body to slide easily over the floor surface without marring or defacing the same.

In Figs. 2 and 3 the caster is substantially the same as that shown in Fig. 1 with the exception that the central portion of the bottom of the shell 12 is cut away as at 12b, and the rubber body 11 is provided with an integral resilient lug 11c which projects through the opening 12b and contacts directly with the floor surface to further cushion the furniture and prevent the caster from readily sliding. This type caster may be used on hard wood floors and would keep the floor from being marred and would be less readily slidable, while the shell 12 would keep the rubber body 11 from spreading due to the weight of the furniture.

Instead of having a single protruding lug 11c on the bottom of the caster the shell 12 may be provided with a plurality of perforations 12c, as in Fig. 4, through which a plurality of protruding rubber lugs 11d extend.

The caster shown in Fig. 5 is substantially the same as in Fig. 1 with the exception that the rubber shank 21a is threaded, as at 21e to engage corresponding interior threads in the interior of the hollow leg L. Instead of threads 21e the same might comprise corrugations.

In Fig. 6 the caster is substantially the same as shown in Fig. 1 with the exception that the outer wall of the recess 31b is corrugated, as at 31f, to engage exterior threads on the leg L.

In Fig. 7 both the shank 41a and the walls of the recess 41b are threaded or corrugated as at 41e, 41f, to increase the frictional hold of the caster on the leg L.

In Fig. 8 the caster is substantially the same as that shown in Fig. 1 except that the shank 51a is straight-sided instead of being tapered or conical.

In Fig. 9 the caster is substantially the same as shown in Fig. 1 except that the retaining shell or casing is omitted, the caster being made entirely of rubber.

In Figs. 10 and 11 the casters are substantially the same as shown in Fig. 5 but instead of using threads or corrugations (such as 21e, Fig. 5) on the shank 21a the shank is provided with one or more molded laterally projecting lugs or knobs 71k adapted to enter holes L² drilled into the legs L adjacent the lower ends, the knobs yieldably retaining the casters on the legs. The body 71 may contain the recess 71b as in Fig. 11.

Fig. 10 shows a body 71x substantially the same as body 71 in Fig. 11, but with the recess omitted.

I do not limit my invention to the exact forms shown in the drawing, for obviously changes may be made therein within the scope of the claims.

I claim:

1. A caster for hollow furniture legs, comprising a resilient body of greater width than the leg, said body having a shank on its upper end adapted to snugly fit within the hollow leg, and having a relatively deep and narrow recess around the base of the shank adapted to receive the lower end of the leg and frictionally engage the outer and inner surfaces thereof to retain the caster thereon; a retaining shell of slidable material around the lower portion of the body, the retaining shell having openings in its base; and integral resilient lugs on the lower end of the body slightly projecting therethrough below the shell.

2. A caster for hollow furniture legs comprising a resilient body of greater width than the leg, said body having a shank on its upper end adapted to snugly fit within the hollow leg, and an integral knob on the side of the shank adapted to enter a hole in the leg to yieldably retain the caster thereon.

3. A caster for hollow furniture legs, comprising a resilient body of greater width than the leg, said body having a shank on its upper end adapted to snugly fit within the hollow leg, and having a relatively deep and narrow recess around the base of the shank adapted to receive the lower end of the leg and frictionally engage the outer and inner surfaces thereof to retain the caster thereon; a retaining shell of slidable material around the lower portion of the body, an integral knob on the side of the shank adapted to enter a hole in the leg to yieldably retain the caster thereon.

CLIFFORD A. SCHACHT.